# 3,345,777
SUPPORTING BRACKET FOR WINDOWS
Axel W. Anderberg, Los Angeles, and George A. Taylor, Glendale, Calif., assignors to A. W. Anderberg Manufacturing Co., Los Angeles, Calif., a corporation of California
Filed Dec. 16, 1965, Ser. No. 514,290
2 Claims. (Cl. 49—248)

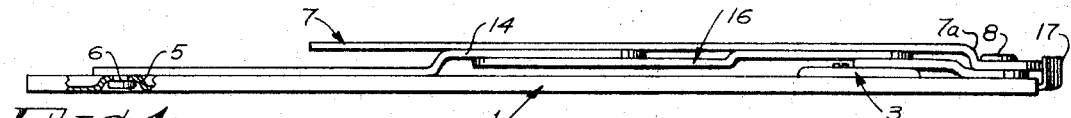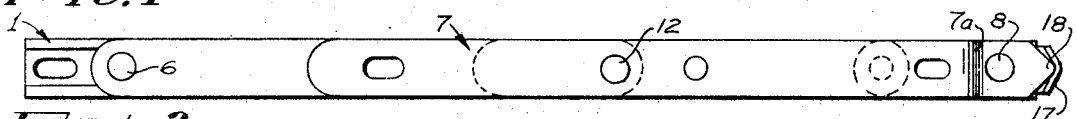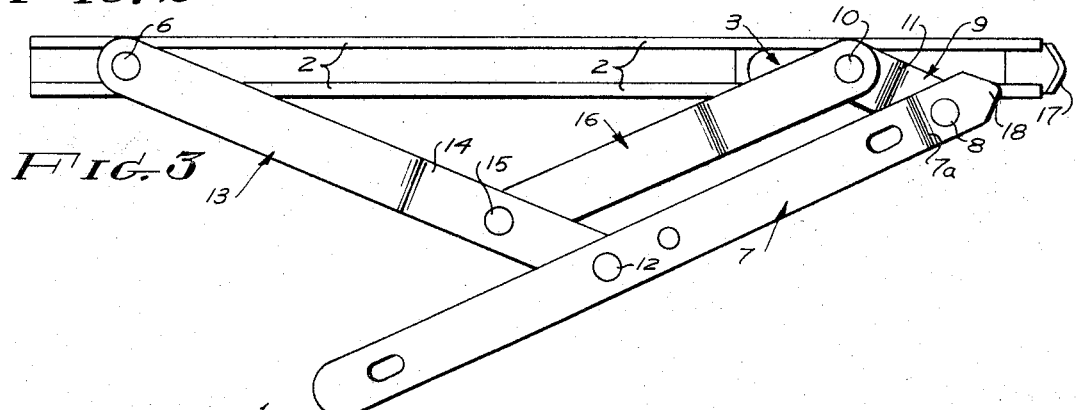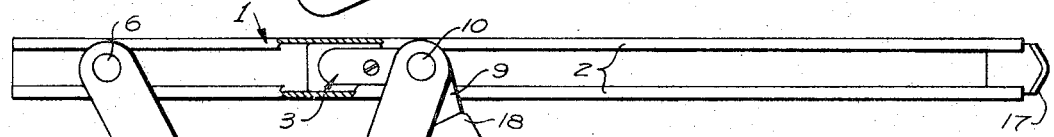

Our invention relates to supporting brackets for windows, more particularly to brackets which are arranged to support a window for pivotal movement about either a vertical or a horizontal axis; the bracket being arranged to cause the pivotal axis of the window to move to and from the window frame so that when the window is open, both surfaces are accessible from the inner side of the window.

Included in the objects of this invention are:

First to provide a supporting bracket for windows which retains many of the features and advantages of our previous Patent No. 2,784,459, issued March 12, 1957, for Supporting Bracket for Windows, and incorporates additional features and advantages.

Second, to provide a supporting bracket for windows which is so arranged as to permit opening of the window to a greater degree than is possible with the bracket constructed in accordance with the bracket disclosed in the aforementioned patent, while utilizing two of the bracket arms as mutually engaging stops.

With the above and other objects in view, as may appear hereinafter, reference is directed to the accompanying drawing, in which:

FIGURE 1 is a side view of the supporting bracket for windows shown in its closed position.

FIGURE 2 is a plan view thereof also in its closed position.

FIGURE 3 is a plan view of the supporting bracket shown in a partially open position.

FIGURE 4 is a plan view of the supporting bracket shown in its fully open position.

The supporting bracket for windows is adapted to be employed for the support of casement type windows or transom type windows, that is, for the support of windows to permit their pivotal movement about a vertical axis or a horizontal axis, and is adapted to be connected between a conventional window frame and window sash, whether these structures be formed of metal or wood and are more fully disclosed in the aforementioned patent.

Each of the pair of brackets utilized to support a window includes a track member 1 having folded side flanges 2. The track member is secured by screws to the window frame, not shown, with one end of the track member adjacent a corner of the window frame.

Mounted on the track member 1 is a slide 3 having side flanges which fit under and are retained by the side flanges 2. The slide is provided with a shallow raised portion forming a cavity confronting the track 1. Mounted within the cavity or raised portion is a friction shoe and leaf spring, as shown in the aforementioned patent.

The slide 3 is slidable between the end of the track member 1, adjacent the corner of a window frame and a position near the opposite or extended end. The end of the track remote from the corner of the window frame is provided with a raised boss 5 extending to a level flush with the upper surfaces of the side flanges 2. The boss 5 is provided with a pivot pin 6.

Secured to the confronting side of the window sash by screws is a flat bar 7. When the window sash is in its closed position within the window frame, the bar 7 overlies or confronts the track 1 with one end adjacent the end of the track disposed in the corner of the window frame.

Near this end of the bar 7, there is provided a downward offset 7a and pivot pin 8.

A short link 9 is pivotally connected between the pivot pin 8 and a pivot pin 10 provided on top of the slide 3. The intermediate portion of the link 9 is provided with a clearance offset 11.

The bar 7 is provided with a second pivot pin 12. A strut 13 extends between the pivot pin 12 and the pivot pin 6 at the remote end of the track 1. The pivot pin 12 is so located that when the bar 7 is in superposed relation with the track 1, the strut 13 is interposed between the track 1 and bar 7 and is in approximate alignment wth the bar 7. This is likewise true of the link 9.

A portion of the strut 13 is offset upwardly as indicated by 14. Within the length of the upwardly offset portion is a pivot pin 15. A bracket 16 extends between the pivot pin 15 and the pivot pin 10 of the slide 3. The length of the link 9, between the pivot pins 8 and 10 and the length of the brace 16 between the pivot pins 10 and 15 combined, are equal to the portion of the strut 13 between the pivot pins 15 and 12, plus the portion of the bar 7 between the pivot pins 12 and 8. The pivot pins 8, 10, 15 and 12 define a four-sided figure; wherein the distance between the pivot pins 15 and 12 is greater than the distance between the pivot pins 8 and 10.

In actual practice, as disclosed more fully in the aforementioned patent, it is not desirable that the axes of the various pivot pins be in strict alignment, that is, the bar 7 is intended to occupy a position parallel to, but laterally offset from, the median line of the track 1, and is capable of occupying either one of two such offset positions. This enables the supporting bracket to be mounted at either end of a window frame and sash without requiring the manufacture or "right" and "left" pairs. By disposing the bar 16 in a laterally offset position, the various pivotal axes are offset sufficiently that the bar moves freely and easily from its offset superposed position to its various angular positions.

It is desirable that the window sash fit tightly against the window frame when the window sash is closed. This is accomplished by a cam member 17 secured to the end of the track 1 adjacent the corner of the window frame. The cam member is spot welded or otherwise secured to the track 1, and includes upright angularly related cam faces defining a truncated V. The corresponding end of the bar 7 is pointed, as indicated by 18, so that the bar 7 moves into its superposed position relative to the track the pointed end 19 engages a corresponding cam face and draws the sash and window tightly together as more fully shown in the aforementioned patent.

In the aforementioned patent, the brace corresponding to brace 16 was fastened to the slide at a point spaced from the pivot pin corresponding to pivot pin 11. As a consequence, it was necessary to provide a stop to prevent movement of the slide "past center." Furthermore, the required location of the stop was such that the window could not be opened to as great an angle as is possible by the present arrangement; nor could the space X between the window and the window frame be as great as in the present arrangement. Increase in the space X facilitates insertion of one's hand and arm as well as cloths or squeegees to clean the outer side of the window.

By reason of the fact that the brace 16 is pivotally connected to the link 9, the link, due to the shorter distance between pivot pins 8 and 10, brings the adjacent ends of the brace 16 and bar 7 together, as indicated by 20 in FIGURE 4 so as to form a stop.

We claim:
1. A supporting bracket, comprising:
 (a) a track;
 (b) a slide movable along said track;

(c) a strut pivotally connected to said track in spaced relation to said slide;

(d) a brace pivotally connected to said slide and said strut for movement of said strut between a position superposed on said track and an angular position;

(e) a link pivotally connected to said slide at the same pivotal axis as the connection of said brace with said slide for movement thereabout;

(f) and a bar pivotally connected to said link and said strut to define, with the pivotal connections of said bar and link, a four-sided figure so proportioned that upon movement of said bar to a predetermined angular position with respect to said track, the side of said bar engages the side of said brace to limit further angular movement of said bar.

2. A supporting bracket according to claim 1, wherein:

(a) said brace is pivotally connected to the side of said strut confronting said track and to the opposite side of said link, said brace having an offset intermediate its ends beyond said strut when said strut and brace are in registry with said track;

(b) said bar is pivotally connected to said link on the same side thereof, as said brace, and said pivoted end engages said brace to limit angular movement of said bar;

(c) and said bar is pivotally connected to the opposite side of said strut from said brace and is offset adjacent said link for movement into registry with said strut when said strut and brace are in registry with said track.

References Cited

UNITED STATES PATENTS

| | | | |
|---|---|---|---|
| 2,784,459 | 3/1957 | Anderberg et al. | 49—248 |
| 3,086,258 | 4/1963 | Fuller | 49—252 |

FOREIGN PATENTS 289,707   6/1965   Netherlands.

DAVID J. WILLIAMOWSKY, *Primary Examiner.*

J. KARL BELL, *Assistant Examiner.*